US009046941B1

(12) United States Patent  
Dropps et al.

(10) Patent No.: US 9,046,941 B1
(45) Date of Patent: Jun. 2, 2015

(54) SYSTEM AND METHOD FOR SHARING LOGIC IN A NETWORK DEVICE

(71) Applicant: QLOGIC, Corporation, Aliso Viejo, CA (US)

(72) Inventors: Frank R. Dropps, Maple Grove, MN (US); Ernest G. Kohlwey, Eagan, MN (US); Lloyd O. Mielke, Crystal, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 268 days.

(21) Appl. No.: 13/678,398

(22) Filed: Nov. 15, 2012

(51) Int. Cl.
G06F 1/04 (2006.01)
G06F 11/00 (2006.01)

(52) U.S. Cl.
CPC ........................................ *G06F 1/04* (2013.01)

(58) Field of Classification Search
CPC .................................................... G06F 1/3203
USPC ......................................................... 713/600
See application file for complete search history.

(56) References Cited

U.S. PATENT DOCUMENTS

| 5,671,400 | A | * | 9/1997 | Kiggens et al. | 703/23 |
| 5,748,629 | A | * | 5/1998 | Caldara et al. | 370/389 |
| 5,982,771 | A | * | 11/1999 | Caldara et al. | 370/389 |
| 5,996,019 | A | * | 11/1999 | Hauser et al. | 709/235 |
| 6,393,021 | B1 | * | 5/2002 | Chow et al. | 370/378 |
| 6,697,362 | B1 | * | 2/2004 | Akella et al. | 370/389 |
| 7,002,967 | B2 | * | 2/2006 | Denton et al. | 370/395.5 |
| 8,825,910 | B2 | * | 9/2014 | Campbell et al. | 710/8 |

* cited by examiner

*Primary Examiner* — Suresh Suryawanshi
(74) *Attorney, Agent, or Firm* — Klein, O'Neill & Singh, LLP

(57) ABSTRACT

Method and system for processing information at a network device connected to a network is provided. The method includes receiving information conforming to a first protocol at a first clock rate at a first sub-port; receiving information conforming to a second protocol at a second clock rate at a second sub-port; storing received information in a temporary storage device at the base-port; reading information out of the temporary storage device at a third clock rate; and processing the information at a MAC module that includes logic that is time-shared among the plurality of sub-ports to process information at the third rate for both the first protocol and the second protocol. The first sub-port is granted access to the logic in a first phase and the second sub-port is granted access to the logic in a second phase for processing the information.

19 Claims, 13 Drawing Sheets

US 9,046,941 B1

SYSTEM AND METHOD FOR SHARING LOGIC IN A NETWORK DEVICE

BACKGROUND

1. Technical Field

The present disclosure relates to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

In one embodiment, a method for processing information at a network device connected to a network is provided. The network device includes a base-port having a plurality of sub-ports that can be configured to operate independently as a port for sending and receiving information at a plurality of rates complying with a plurality of protocols. The method includes receiving information conforming to a first protocol at a first clock rate at a first sub-port; receiving information conforming to a second protocol at a second clock rate at a second sub-port; storing received information in a temporary storage device at the base-port; reading information out of the temporary storage device at a third clock rate; and processing the information at a media access control (MAC) module that includes logic that is time-shared among the plurality of sub-ports to process information at the third rate for both the first protocol and the second protocol; wherein the first sub-port is granted access to the logic in a first phase and the second sub-port is granted access to the logic in a second phase for processing the information that is read out at the third rate.

In another embodiment, a network device coupled to a network via a network link for processing information is provided. The network device includes a processor for executing firmware code; and a base-port including a plurality of sub-ports to receive and transmit information; where the plurality of sub-ports can be configured to operate independently as a port for sending and receiving information at a plurality of rates complying with a plurality of protocols. A first sub-port is configured to receive information conforming to a first protocol at a first clock rate; and a second sub-port is configured to receive information conforming to a second protocol at a second clock rate. The network device further includes a temporary storage device for storing received information that is read at a third clock rate; and a media access control (MAC) module that includes logic that is time-shared among the plurality of sub-ports to process information at the third rate for both the first protocol and the second protocol; wherein the first sub-port is granted access to the logic in a first phase and the second sub-port is granted access to the logic in a second phase for processing information that is read out from the temporary storage device at the third rate.

In yet another embodiment, a system for processing information at a network device is provided. The system includes a computing system coupled to a network; and the network device coupled to the network. The network device includes a processor for executing firmware code; and a base-port including a plurality of sub-ports to receive and transmit information; where the plurality of sub-ports can be configured to operate independently as a port for sending and receiving information at a plurality of rates complying with a plurality of protocols. A first sub-port is configured to receive information conforming to a first protocol at a first clock rate; and a second sub-port is configured to receive information conforming to a second protocol at a second clock rate. The network device further includes a temporary storage device for storing received information that is read at a third clock rate; and a media access control (MAC) module that includes logic that is time-shared among the plurality of sub-ports to process information at the third rate for both the first protocol and the second protocol; wherein the first sub-port is granted access to the logic in a first phase and the second sub-port is granted access to the logic in a second phase for processing information that is read out from the temporary storage device at the third rate.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
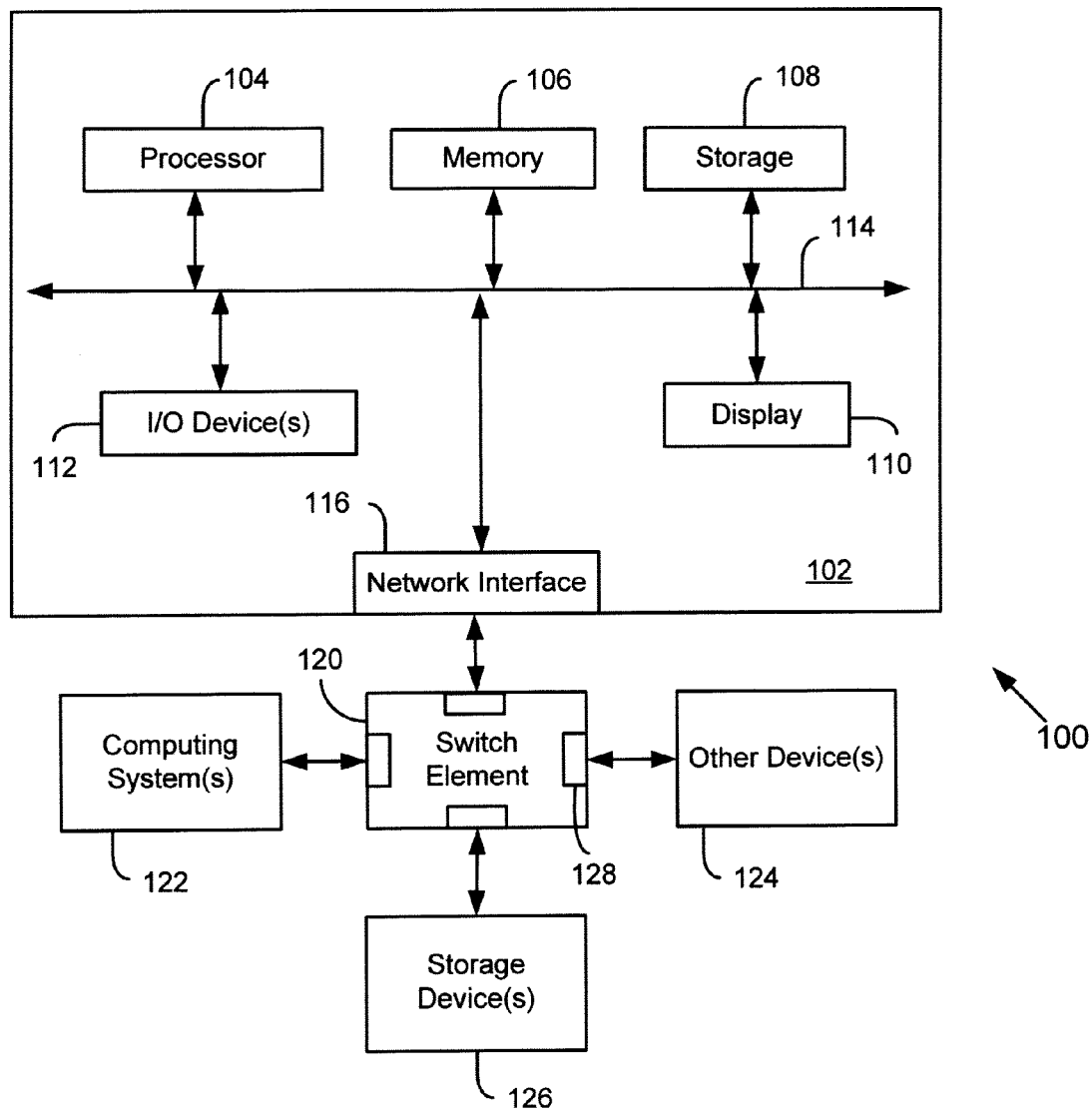

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic." "module," "component." "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g. CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program. firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be computer storage media. readable by a computer device, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI. SCSI. IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches (or other devices, for example, adapters) use memory buffers to temporarily hold frames that are received and sent across a network. Associated with these buffers are credits, which are the number of frames that a buffer can hold per Fabric port.

Fibre Channel devices use the concept of "credits" for managing flow control when sending and receiving information. Typically, before a transmit port can transmit frames, a receiving port sends credit to the transmitting port indicating the number of frames that the receiving port can hold. The credits are based on the space that may be available at the receiving port, at any given time. Thus the transmitting port is only permitted to transmit frames when it has the necessary credits from the receiving port. This prevents situations where the receiving port may overflow with received frames.

Fibre Channel ports use special primitives for providing credits. One such primitive is called an R-RDY that is used by a receiving port to grant credit to a transmit port. Another primitive is a VC_RDY primitive that is used when the receiving port is configured to use virtual lanes (or virtual circuits). Details regarding the use of R-RDYs and VC_RDYs are not germane to the adaptive embodiments disclosed herein.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers. application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse. etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The teiin port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 of host system 102 and an interface (not shown) for the storage devices 126. Fabric ports are typically located in Fabric devices, such as the switch element 120. Details regarding the switch 120 are provided below.

Figure 2A:
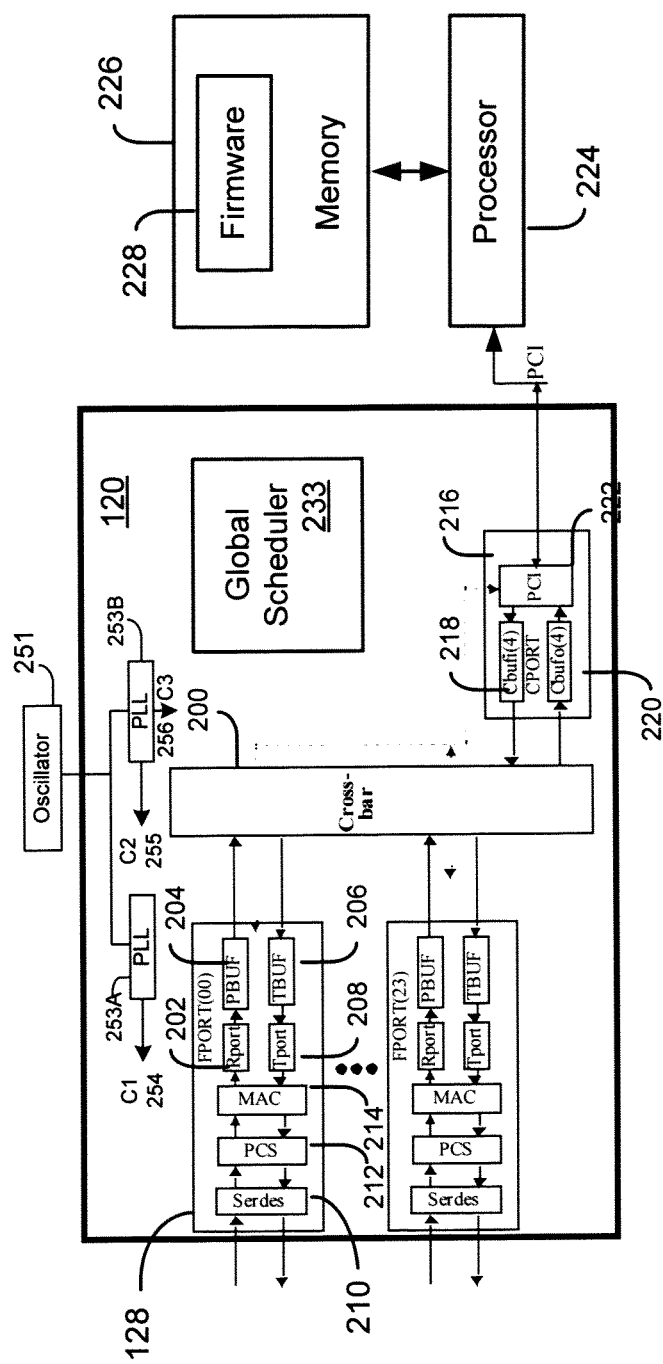
FIG. 2A is a functional block diagram of a switch element according to the present embodiments.

FIG. 2A is a high-level block diagram of switch element 120, also referred to as the switch 120 having a plurality of ports 128. Switch element 120 may be implemented as an application specific integrated circuit (ASIC). An external oscillator 251 may be used to power a plurality of phase locked loop (PLL) circuits 253A-253B to generate a plurality of clocks, C1 254, C2 255 and C3 256 that are described below in detail. As an example, C1 254 may be 425 MHz when a port is configured to operate as a Fibre Channel port, C2 255 may be 312 Mhz when a port is configured to operate as an Ethernet port, and C3 256 may be a system clock of 825 MHz. The embodiments disclosed herein are not limited to any particular clock rate.

Ports 128 are generic (GL) ports and may include an N_Port, F_Port, FL_Port, E-Port, or any other port type. Ports 128 may be configured to operate as FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data at clock C1 254 or C2 255 and converts it to parallel data. The parallel data is then sent to the PCS 212 for processing, for example, 8b to 10b coding. The data is read from PCS 212 at clock C3 256 i.e. the system clock generated by PLL 253B. The data from PCS 212 is sent to MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT also includes a shared MAC and PCS. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of sub-ports, each uniquely identified for receiving and sending frames. Each sub-port may operate as an independent port within the base-port. The configuration of each sub-port may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
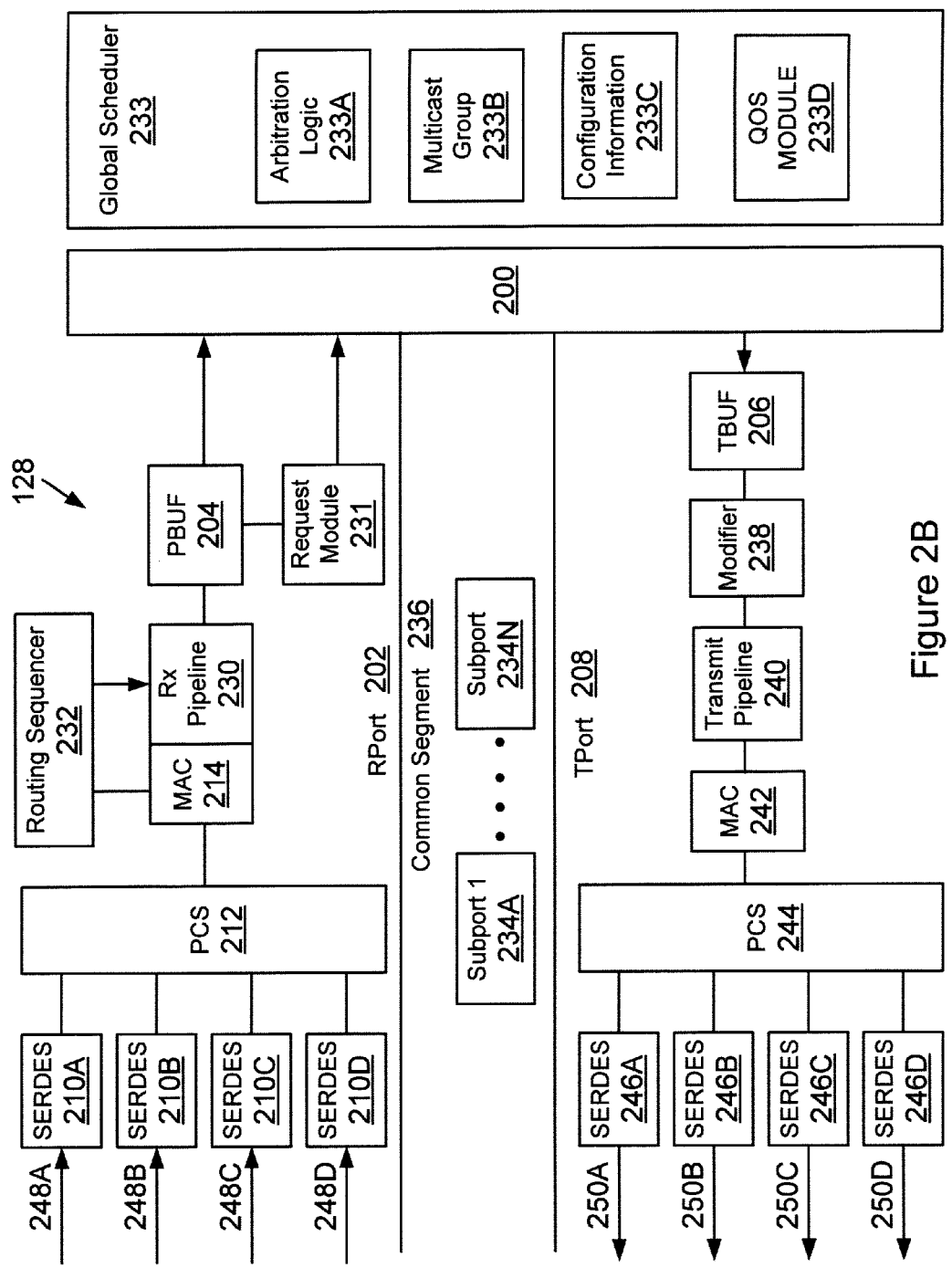
FIG. 2B is a block diagram of a base-port, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128. In one embodiment, base-port may be configured to include a plurality of sub-ports. The configuration information/logic 234A-234N for each sub-port may be stored in common segment 236. The routing sequencer 232 may include routing look up tables or other data structures.

RPORT 202 may include or have access to a plurality of network links (or lanes), for example, four independent physical network links (or lanes) 248A-248D, each configured to operate as a portion of an independent sub-port within base-port 128. Each network link is coupled to a SERDES 210-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. It is noteworthy that PCS 212 and MAC 214 may be a part of pipeline 229.

Incoming frames are received via one of the network links 248A-248N. The received frame is processed by the appropriate SERDES 210A-210D and then sent to the PCS 212. After PCS 212 processes the frame, the frame is provided to MAC 212 that is time shared among a plurality of sub-ports. This means that for a certain time segment (for example, clock cycles). MAC 214 may be used by one of the sub-ports. After MAC 214 processes the frame it is sent to receive pipeline 230 that is also time shared. Information regarding the frame or a copy of the frame is also provided to a routing sequencer 232 that determines the destination of the received packets. In one embodiment, a frame whose destination is processor 224 is given the highest priority, followed by a frame that is routed by a TCAM (ternary content addressable memory) or steering registers located within the routing sequencer 232. It is noteworthy that more than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

To move frames from the receive queues; a request module 231 generates requests for a global scheduler 233, also referred to as scheduler 233. Request module 231 maintains a data structure (not shown) that tracks a number of requests that may be pending for each sub-port. Request module 231 also removes requests from the data structure when a grant is received for a particular request.

Scheduler 233 stores configuration information 233C for various ports and some of that information may be used to select requests. Scheduler 233 includes arbitration logic 233A that performs dual stage arbitration for requests from various base-ports. Scheduler 233 also maintains a data structure at a memory labeled as multicast group 233B. The data structure stores information for identifying multicast groups that may receive multicast frames i.e. frames that are destined to multiple destinations.

Figure 3A:
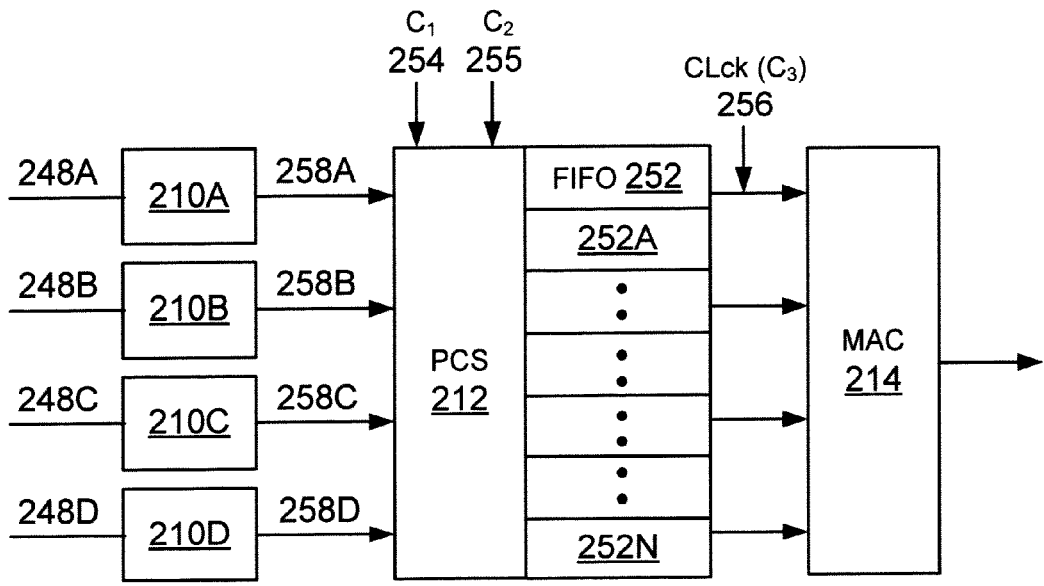
FIGS. 3A and 3B show frame processing by a base-port.

Frames for transmission via TPORT 208 move via TBUF 206 and a modifier 238. In one embodiment, modifier 238 may be used to insert, change or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. In one embodiment, there are multiple requests and grants processed simultaneously. It is noteworthy that MAC 242 and PCS 244 have been shown for clarity and the transmit segment may share the PCS 212 and MAC 214 modules of the RPORT 202, FIG. 3A illustrates an example of receiving frames 258A-258D at PCS 212 from SERDES 210A-210D. The frames may be received at different clock rates based on the configuration of network links 248A-248D and the associated sub-ports. As an example, frames (or data) may be received at PCS 212 and stored at C1 254 and/or C2 255 and then read out of PCS 212 at clock C3 256. Clock C3 may also be referred to as system clock. PCS 212 includes a memory storage device (shown as FIFO) 252 having a plurality of storage locations 252A-252N. The storage locations are used to stage frames or portions of a frame before the frames are read out at C3 256. The storage locations 252A-252N may be used to prevent overrun or under run conditions, as described below in detail.

Figure 3B:
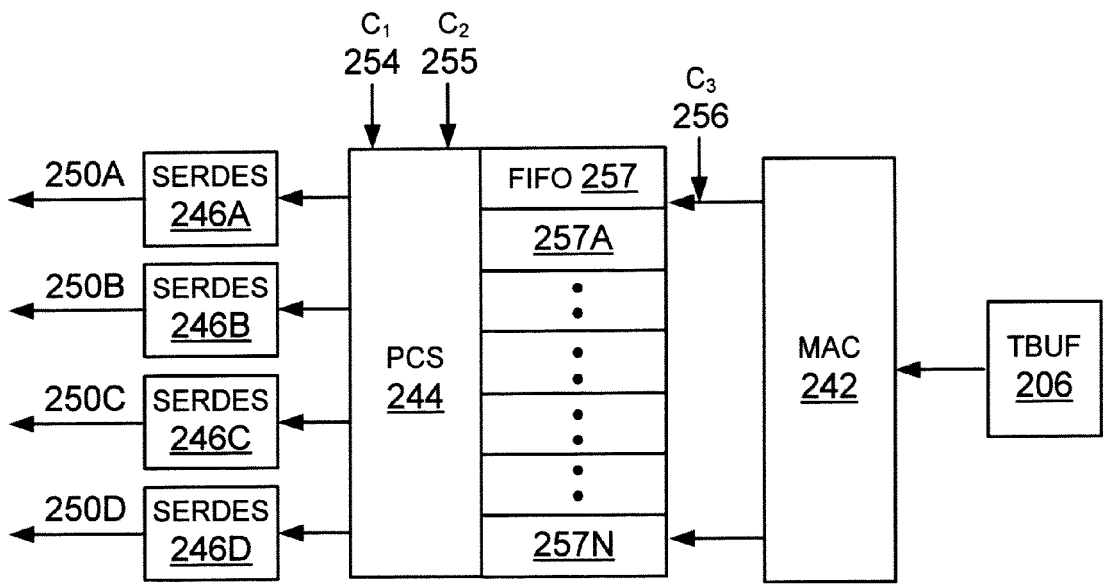

In the transmit path, as shown in FIG. 3B, frames are received at FIFO 257 with storage locations 247A-247N via TBUF 206 and shared MAC 214. In the transmit path, frames are written to FIFO 257 using the system clock 256 and read out at a clock rate C1 254/C2 255 to match the sub-port link rate. A read control logic (not shown) is used to read data from TBUF 206 to avoid any errors due to a mismatch between the system clock and the clock at which data is read out for transmission from PCS 244.

Figure 4:
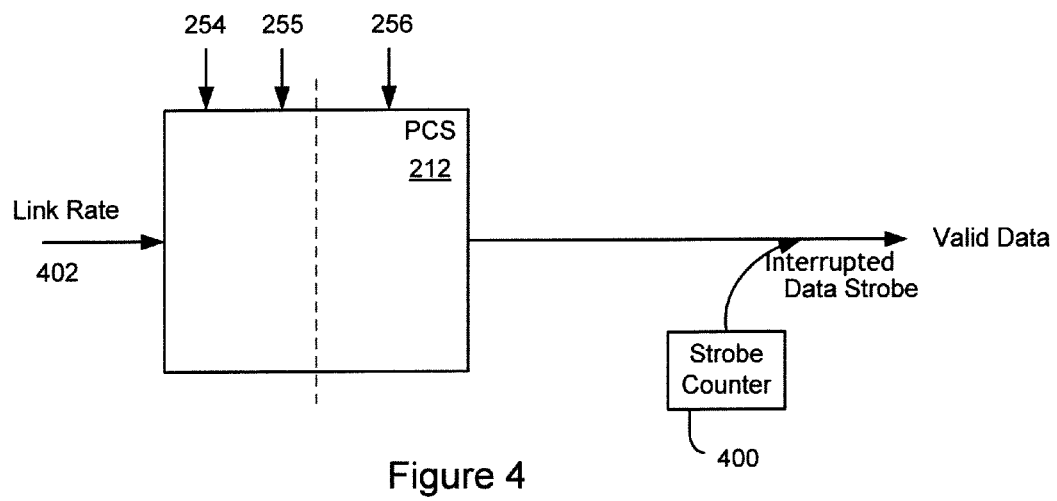
FIG. 4 is a functional block diagram of the physical coding sub-layer (PCS) of FIG. 3. according to one embodiment.

FIG. 4 shows a block diagram using a strobe counter 400 that generates a valid value for reducing error due to a mismatch between clocks C1, C2 and C3, according to one embodiment. The strobe counter 400 provides periodic interruptions to the data read out operation from FIFO 252. For example, since the link rate 402 for a network link (for example, 248A) is known, it is possible to match that rate by reading out data on average X times for every Y cycles of the system clock C2 256. where X<Y. To achieve the matching, strobe counter asserts a valid signal for each clock cycle during which data should be read out, if it is available. Periodically, strobe counter 400 asserts an invalid signal for each clock cycle during which data should not be read out, even if it is available. Over time, the rate at which data is read out of the PCS 212 matches the rate at which data is written in. In certain embodiments, the distribution of invalid signals in the read operation is substantially uniform in order to avoid errors, as discussed below.

Figure 5A:
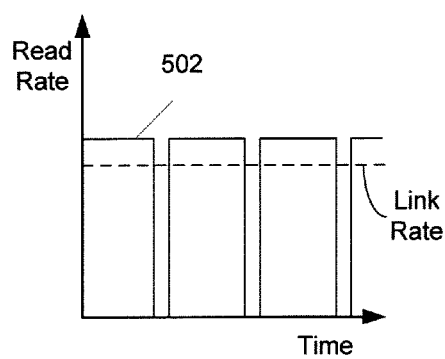
FIG. 5A is a graph plotting read rate versus time, according to one embodiment.

FIG. 5A is a graph plotting read rate versus time when the read rate is higher than the link rate 402, such as in certain of the present embodiments. The square curve 502 represents the rate at which data is read out of the PCS 212, while the horizontal dashed line represents the link rate 402, or the rate at which incoming data is written to the PCS 212. Because the read rate is higher than the link rate, the read operation must be periodically interrupted in order to avoid an under run condition. An under run condition occurs when data is read out too fast, causing the buffer to run out of data, which can cause packets to become corrupted. Thus, the horizontal portions of the read rate curve that are located above the link rate line represent intervals when data is being read out of the PCS 212 if it is available, i.e. intervals when the strobe counter 400 is asserting a valid signal. The portions of the read rate curve that are located on the x-axis represent periodic interruptions in reading data, i.e. intervals when the strobe counter 400 is asserting an invalid signal such that data is not being read out of the PCS 212 even if it is available. Ideally, the area under the read rate curve is equal to the area under the link rate line, which indicates that over time the average read rate equals the link rate.

Figure 5B:
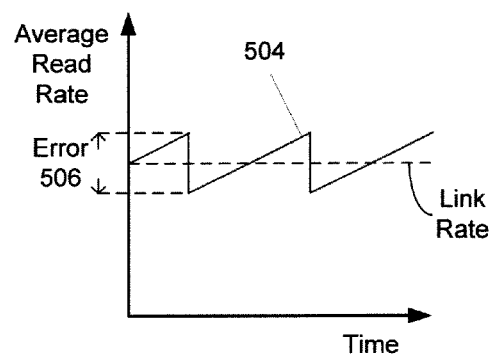
FIG. 5B is a graph plotting read rate error versus time, according to one embodiment.

FIG. 5B is a graph plotting average read rate versus time for the system of FIG. 5A. The saw-tooth curve 504 represents the average read rate over time. As discussed above, the read operation is periodically interrupted so that under runs may be avoided. Thus, as reads are occurring, the average read rate rises. The average read rate rises drops steeply each time the read operation is interrupted, hence the saw-tooth curve 504 shown in FIG. 5B.

The vertical band labeled "Error" 506 in FIG. 5B represents upper and lower boundaries of the average read rate for the system. If the average read rate rises above the vertical band, an error (under-run) occurs because data is being read out of the PCS 212 faster than it is being written in. If the average read rate falls below the vertical band, an error (overrun) occurs because data is being read out of the PCS 212 slower than it is being written in. Preferably, the clock cycles during which the strobe counter 400 asserts an invalid signal are evenly distributed across the read operation, which results in the repeating saw-tooth 504 curve shown in FIG. 5B. The clock cycles during which the strobe counter 400 asserts an invalid signal are represented by the vertical portions of the saw-tooth curve 504, while the diagonal portions of the saw-tooth curve represent the clock cycles during which the strobe counter 400 asserts a valid signal. Evenly distributing the clock cycles during which the strobe counter 400 asserts an invalid signal avoids errors because the average read rate is not allowed to ever climb above or drop below the vertical band labeled "Error" in FIG. 5B. In some embodiments, the clock cycles during which the strobe counter 400 asserts an invalid signal may not be evenly distributed. However, preferably they are distributed to avoid large contiguous strings of either valid signals or invalid signals over time.

The foregoing discussion has focused on only a single direction of data movement, data incoming to the port 128. The same aspects can be applied to outgoing data. Or, in certain embodiments rate matching for outgoing data can be controlled by the TBUF 206.

The rate matching of the present embodiments may be configured to be compatible with a time multiplexed environment. As discussed above, each base-port 128 is divided into sub-ports (not shown). Each of the sub-ports moves data during only certain phases of each clock cycle, such as only during one phase of each cycle. Thus, whether or not a given sub-port can input or output data at any given time is determined by whether its designated clock phase for moving data matches the current clock phase, as discussed below with respect to FIG. 6. The current clock phase may be determined by a counter that continuously cycles through X phases, such as by repeatedly counting 0, 1, 2, 3, 0, 1, 2, 3, 0, 1, 2, 3 . . . , for example. If a given sub-port is designated to move data only during phase 2, then it can move data only when the counter is equal to 2. The phase counter could be located in CPORT 216 or almost anywhere on the switch element 120 and distributed globally to all of the base-ports. Alternately phase counters could reside in multiple places like one in each base-port as long as they are synchronized with each other.

Figure 6:
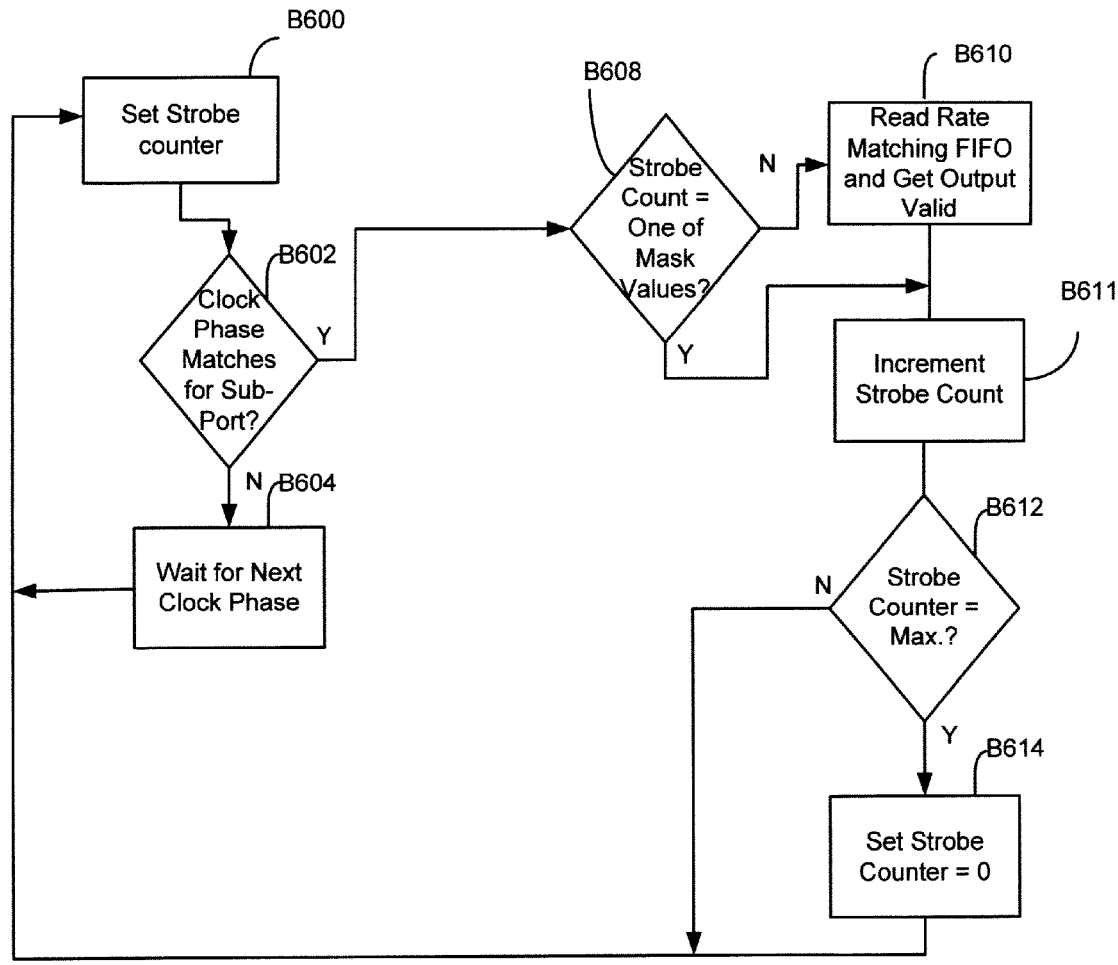
FIG. 6 is a flowchart illustrating one of the present embodiments of methods for rate matching in networks.

FIG. 6 is a flowchart illustrating one of the present embodiments of methods for rate matching in networks. The process begins in block B600 when the strobe counter is set equal to zero at the start and the process advances to block B602. In block B602, the process determines whether a current clock phase matches the phase during which a given sub-port is designated to read from the PCS 212. As described above PCS 212 is a, shared resource and each sub-port is given access to read out data from PCS 212 during a certain phase. If a current phase does not match the sub-port for which there may be data stored at PCS 212, then the sub-port simply waits for the next clock cycle at block B604 and then loops back to block B602.

However, if there is a match at block B604 then the process then advances to block B608, where the process determines if the strobe counter 400 is equal to one of the mask values. The mask values are strobe count values when the data valid is driven inactive and data is not read from the PCS. In other words, the mask values are the strobe count values when the read rate shown in FIG. 5A is on the x-axis. If the masked values do not match the strobe count value, then the process advances to block B610, when data is read out PCS 212 FIFO 252. The strobe counter 400 generates a valid signal i.e. a bit value indicating that the data that is read is valid. The process then advances to block B611. The process also moves to block B611, if there is a match in block B608.

In block B611, the strobe counter 400 is incremented (or increased). The process then advances to block B612, where it is determined whether the strobe counter 400 has reached its maximum value. As discussed above, the strobe counter 400 repeatedly counts from a first value to a second value, such as from zero to three. When the counter reaches three, it resets to zero. Thus, if the answer at block B612, is yes, then the process then advances to block B614 where the counter value is reset to a value of zero. The process then loops back to block B602. However, if the answer at block B612 is no, then the process skips block B614 and loops back to block B602.

Figure 7A:
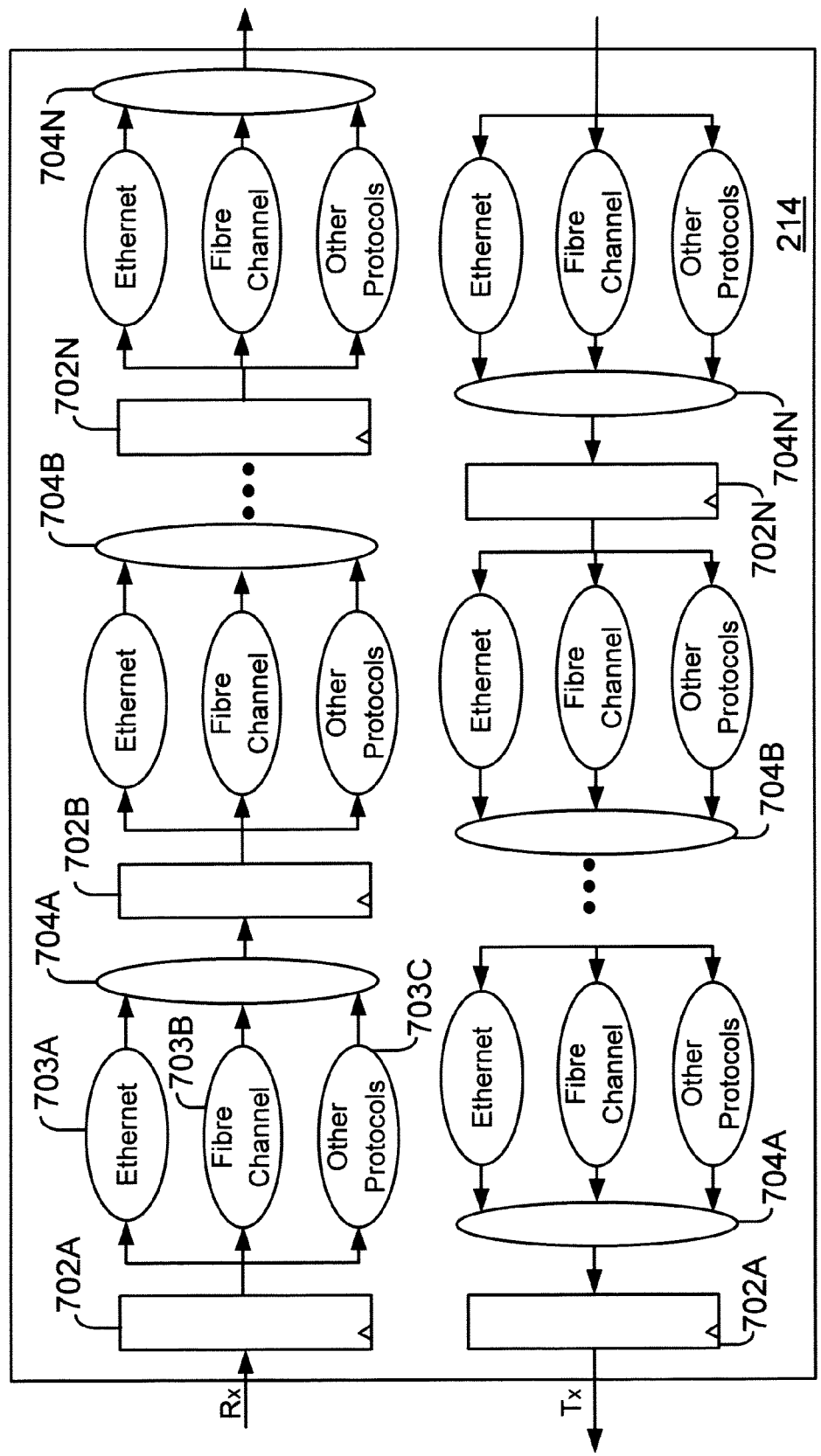
FIGS. 7A and 7B illustrate stages in a MAC pipeline, according to one embodiment.

Fibre Channel and Ethernet (including FCoE) frames are read out of PCS 212, then received and subsequently processed by MAC 214 at the same clock rate C3 256 (regardless of protocol line rate). When read out of PCS 212, the Fibre Channel and Ethernet frames are a double word (for example, two 32-bit words wide). FIG. 7A illustrates an example of receiving and processing frames at MAC 214 from FIFO 252 of PCS 212. As noted above, the MAC 214/receive pipeline 230 (hereafter simply "MAC 214") are time multiplexed so that MAC 214 can be shared among a plurality of sub-ports based on how the network links 248A-248D and associated sub-ports are configured to operate (e.g., Fibre Channel or Ethernet; single lane. dual lane, or quad lane and others).

As illustrated in FIG. 7A, there are multiple stages in MAC 214 with Fibre Channel and Ethernet frames being processed at one or more of the stages using some amount of shared combinatorial logic. The Ethernet and Fibre Channel frames share the same pipeline registers 702A-702N and may use independent combinatorial logic 703A, 703B and 703C (shown in the cloud shapes as "Ethernet," "Fibre Channel," and "Other Protocol", respectively). In the illustrated embodiment, the combinatorial logic 703A-703C and pipeline registers 702A-702N for cyclic redundancy code (CRC) checking pipeline stage are shared by multiple protocols. Each stage includes particular combinatory logic that performs a particular function. Some of the functions performed by combinatory logic in the shared MAC pipeline include, but are not limited to: FCoE Packet Type Detection; RMON (remote network monitoring) statistics Capture; Link Fault Handling; Per Priority Pause Flow Control; format conversion; Move start of frame (SOF) to first word of a double word; Add fill on end of frame (EOF) to place EOF in second word of double word; Credit handling; Transmit primitive sequences on the transmit side; Frame error reporting and frame invalidation; CRC checking; Ordered Set Detection; Start of Frame Detection; End of Frame Detection; and Delay.

Time multiplexing at each stage using MUX 704A-704N allows logic to be shared among the sub-ports for different protocols. That is, at each stage, frames of a particular sub-port in a particular phase are processed by the combinatorial logic while frames of the sub-ports not in that particular phase are not processed by the combinatorial logic, as described in more detail below. The foregoing allows for more efficient die area utilization because the pipeline registers and combinatorial logic are not duplicated. This also allows for similar functions to share combinatorial logic.

Figure 7B:
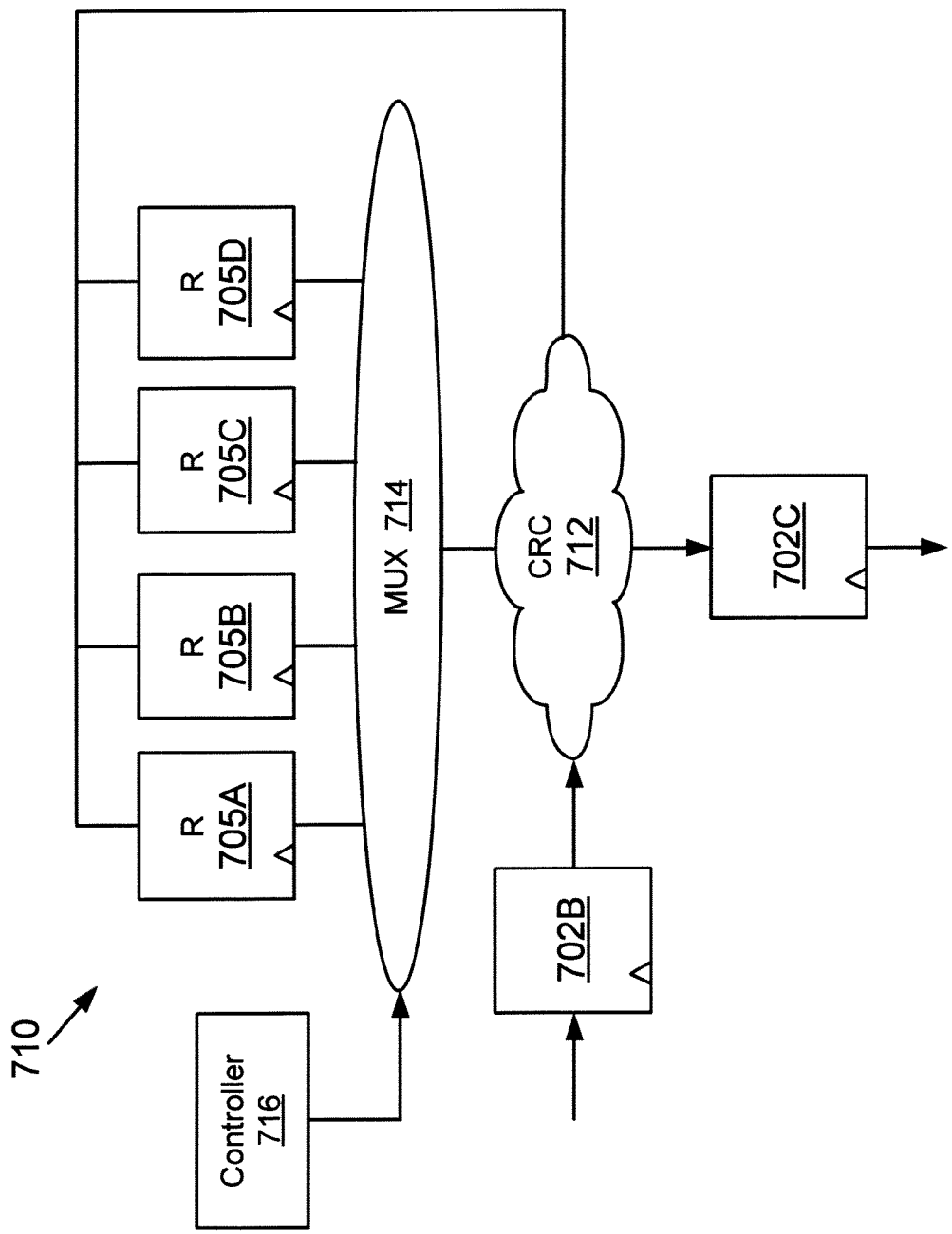

While FIG. 7A illustrates stages in the MAC pipeline in general, an example of one particular stage is illustrated in FIG. 7B which shows a cyclic redundancy check (CRC) checking circuit 710 in the pipeline shared by time multiplexed Fibre Channel and Ethernet frames. Fibre Channel and/or Ethernet frames are illustrated as moving from shared register 702B and being subsequently processed by CRC logic 712. CRC logic 712 processes the frames and passes them on to shared register 702C. The residual interim values from the CRC check are stored in separate auxiliary registers (705A-705D) shown as "R" that may not be a part of the shared MAC pipeline. Four registers R are used (one for each phase) because each phase (time slice) has a residue. Controller 716 and mux 714 are used for reading and writing the residual interim values.

When running a dual lane sub-port, only one of two residue registers 705A-705D is used but it is used twice; for two of the four phases. When running a quad lane sub-port, only one of four residue registers is used but it is used four times; for all four of the phases. The foregoing illustrates dedicated logic capable of handling different protocols and a common module for both protocols to perform CRC calculations.

Figure 8A:
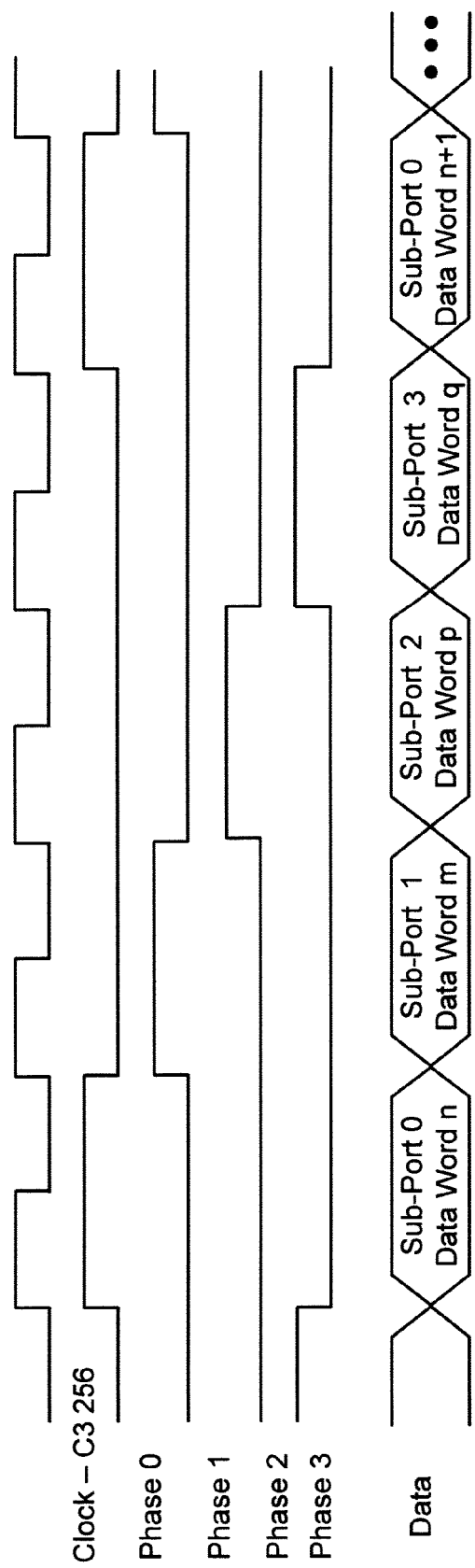
FIGS. 8A and 8B illustrate time multiplexing in a MAC pipeline, according to one embodiment.
Figure 8B:
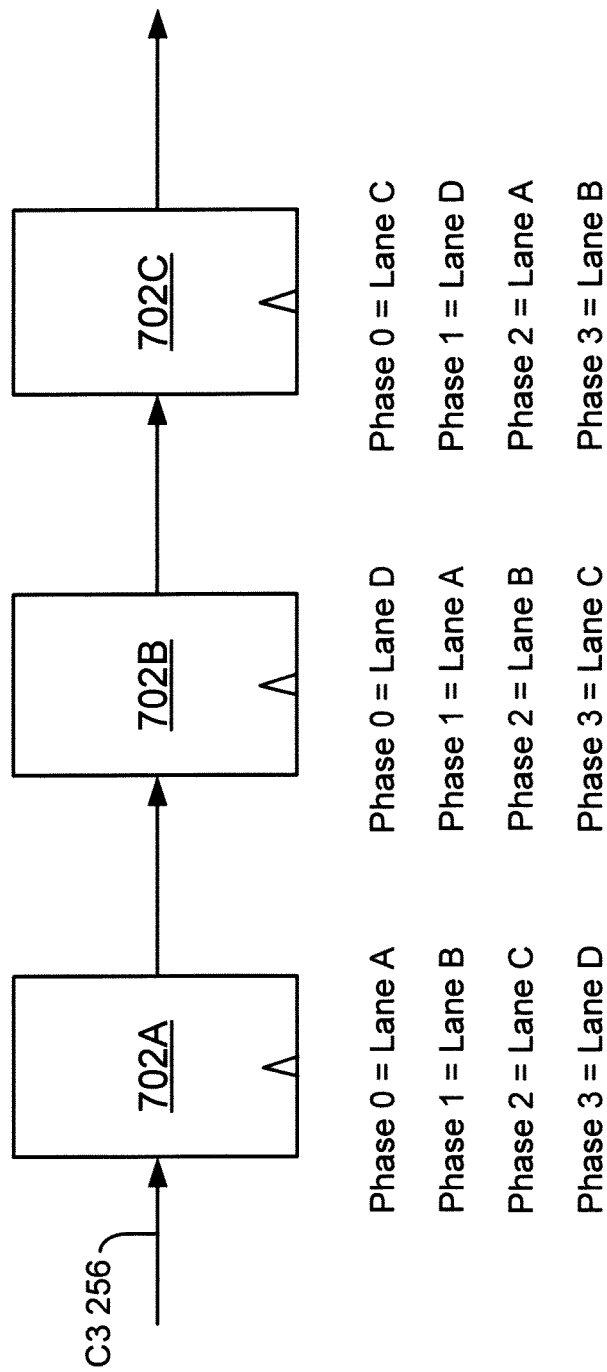

FIGS. 8A and 8B illustrate time multiplexing in MAC 214, according to one embodiment. As already noted, time multiplexing allows MAC 214 to support multiple lanes of slower ports or for phases to be grouped together to form fewer higher rate multilane ports. FIG. 8A illustrates how four sub-ports, labeled as sub-port 0, 1, 2 and 3 share MAC 214 in four different phases, labeled as phase 0, 1, 2 and 3. The four phases are within the same system clock C3 256. For example, in phase 0, sub-port 0 uses MAC 214, in phase 1, sub-port 1 uses MAC 214, in phase 2, sub-port 2 uses MAC 214 and in phase 3, sub-port 3 uses MAC 214. The cycle then repeats such that the various sub-ports of base-port 128 use the same MAC 214 for processing frames.

FIG. 8B illustrates a configuration where Lanes A-D (i.e. 248A-248D) corresponding to sub-ports 0-3, respectively, use the logic within MAC 214, according to one embodiment. The term lane in this example means network links 248A-248D.

Frames enter MAC 214 at system clock C3 256 and are then staged at registers 702A-702C, as an example. At register 702A, for example. Phase 0 is associated with frames received by Lane A, Phase 1 is associated with frames received by Lane B, Phase 2 is associated with frames received by Lane C and Phase 3 is associated with frames received by Lane D.

At a next stage, the lanes are rotated such that at register 702B. Phase 0 is associated with Lane D frames, Phase 1 is associated with Lane A frames, Phase 2 is associated with Lane B frames and Phase 3 is associated with Lane C frames. Lane associations are again rotated at the next stage such that at register 702C, Phase 0 is associated with Lane C frames. Phase 1 is associated with Lane D frames, Phase 2 is associated with Lane A and Phase 3 is associated with Lane B frames.

At each subsequent stage in the MAC pipeline, lane associations are rotated in subsequent phases. When multiple lanes are used, there are multiple clock stages where a single lane port only uses one of the four phases, a dual lane port uses two of the four phases and a quad lane port uses all four phases.

Figure 9A:
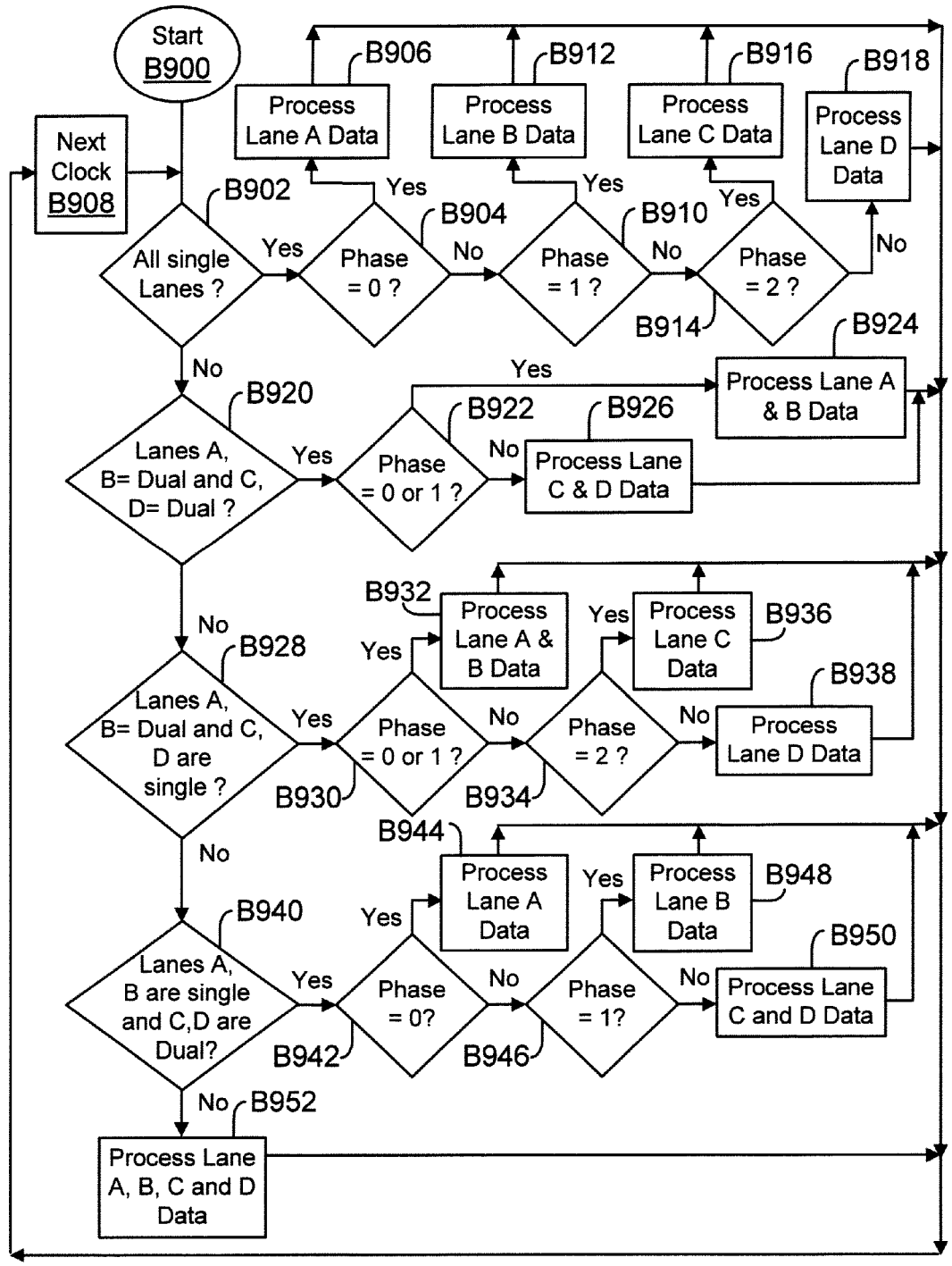
FIGS. 9A/9B and 10 show flow diagrams illustrating processing of frames in the MAC pipeline, according to one embodiment.

FIG. 9A is a flowchart illustrating one of the present embodiments of methods for processing frames at MAC 214, according to one embodiment. As described above, MAC 214 is a time-multiplexed, shared resource and each sub-port is given access to logic of MAC 214 during a certain phase. At each subsequent stage, the lanes (i.e., sub-ports) are rotated and each sub-port is given access to logic during a different phase. The process begins in block B900. The initial part of the process involves determining whether port 128 is configured as all single lanes, a combination of single and dual lanes, two dual lanes or as a quad lane. At this stage, Phase 0 is associated with Lane A frames, Phase 1 is associated with Lane B frames. Phase 2 is associated with Lane C frames and Phase 3 is associated with Lane D frames.

In block B902, the process determines whether a port 128 is configured as all single lanes. If so, the process determines in block B904 if the current phase is Phase 0. If yes, in block B906, Lane A data is processed by logic for a particular function (e.g. Link Fault Handling; Per Priority Pause Flow Control (based on Ethernet standards); CRC checking; credit handling based on the protocols; etc.) at that particular stage in the MAC pipeline (see FIG. 9B for processing of lane data). After Lane A data is processed, the process waits for the next clock, block B908, and loops back to block B902.

If the phase was not determined to be Phase 0 at block B904, the process then, in block B910, determines if a current phase is Phase 1. If yes, in block B912 Lane B data is processed by logic for the particular function at that particular stage in the MAC pipeline (see FIG. 9B). After Lane B data is processed, the process waits for the next clock in block B908. and loops back to block B902.

If the phase was not determined to be Phase 0 at block B904 or Phase 1 at block B910, the process then, in block B914, determines if a current phase is Phase 2. If yes, in block B916 Lane C data is processed by logic for the particular function at that particular stage in the MAC pipeline (see FIG. 9B). After Lane C data is processed, the process waits for the next clock in block B908, and loops back to block B902.

Figure 9B:
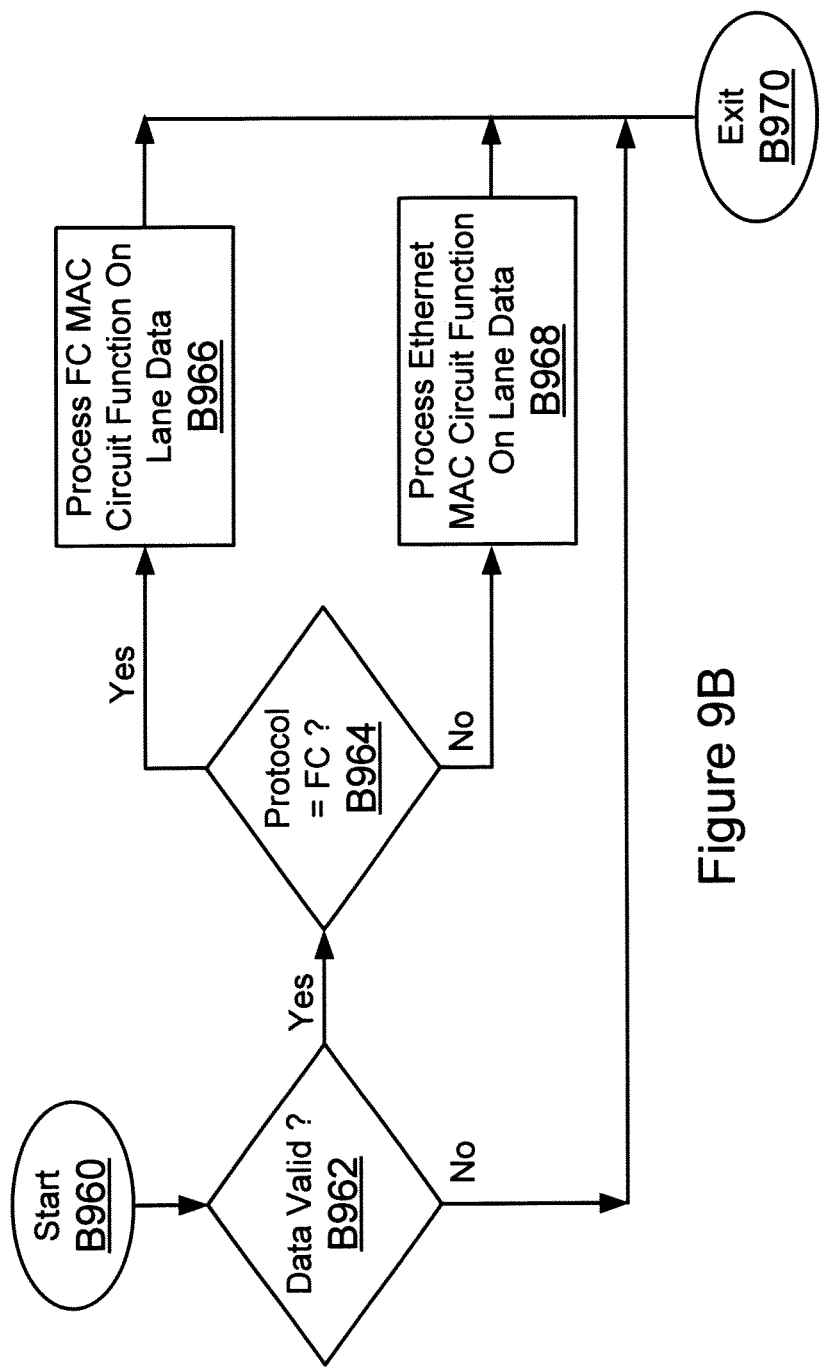

If the phase was not determined to be Phase 0 at block B904, Phase 1 at block B910, or Phase 2 at block B914, the process proceeds to block B918 where Lane D data is processed by logic for the particular function at that particular stage in the MAC pipeline (see FIG. 9B). After Lane D data is processed, the process waits for the next clock in block B908, and loops back to block B902.

In block B902, if the process determines port 128 is not configured as all single lanes, the process proceeds to block B920 to determine if Lanes A and B are configured as a dual lane and Lanes C and D also configured as a dual lane. If so, the process determines in block B922 if a current phase is either Phase 0 or Phase 1. If yes, in block B924. Lane A and B data is processed by logic for the particular function at that particular stage in the MAC pipeline (see FIG. 9B). After Lane A and B data is processed, the process waits for the next clock in block B908, and loops back to block B902.

If the phase was not determined to be Phase 0 or 1 at block B922, the process proceeds to block B926 where Lane C and Lane D data is processed by logic for the particular function at that particular stage in the MAC pipeline (see FIG. 9B). After Lane C and Lane D data is processed, the process waits for the next clock in block B908, and loops back to block B902.

In block B920, if the process determines Lanes A and B and Lanes C and D are not configured as dual lane, the process proceeds to block B928 to determine if Lanes A and B are configured as dual lane and if Lanes C and D are each single lane. If so, the process determines in block B930 if the current phase is either Phase 0 or Phase 1. If yes, in block B932, Lane A and B data is processed by logic for the particular function at that particular stage in the MAC pipeline (see FIG. 9B). After Lane A and B data is processed, the process waits for the next clock in block B908, and loops back to block B902.

If the phase was not determined to be Phase 0 or 1 at block B930, the process proceeds to block B934 to determine if a current phase is Phase 2. If yes, in block B936 Lane C data is processed by logic for the particular function at that particular stage in the MAC pipeline (see FIG. 9B). After Lane C data is processed, the process waits for the next clock in block B908, and loops back to block B902.

If the phase was not determined to be Phase 0 or Phase 1 at block B930 or Phase 2 at block B934, the process proceeds to block B938 where Lane D data is processed by logic for the particular function at that particular stage in the MAC pipeline (see FIG. 9B). After Lane D data is processed, the process waits for the next clock in block B908, and loops back to block B902.

In block B928, if the process determines if Lanes A and B are not configured as dual lane and that Lanes C and D are not each single lane, the process proceeds to block B940 to determine if Lanes A and B are each configured as single lane and if Lanes C and D are configured as dual lane. If so, the process determines in block B942 if a current phase is Phase 0. If yes, in block B944, Lane A is processed by logic for the particular function at that particular stage in the MAC pipeline (see FIG. 9B). After Lane A data is processed. the process waits for the next clock in block B908, and loops back to block B902.

If the phase was not determined to be Phase 0 at block B942, the process proceeds to block B946 to determine if a current phase is Phase 1. If yes, in block B948 Lane B data is processed by logic for the particular function at that particular stage in the MAC pipeline (see FIG. 9B). After Lane B data is processed, the process waits for the next clock in block B908, and loops back to block B902.

If the phase was not determined to be Phase 1 at block B946, the process proceeds to block B938 where Lane C and D data is processed by logic for the particular function at that particular stage in the MAC pipeline (see FIG. 9B). After Lane C and D data is processed, the process waits for the next clock in block B908, and loops back to block B902.

In block B940, if the process determines if Lanes A and B are not each configured as single lane, and Lanes C and D are not configured as dual lane, the process determines that Lanes A, B, C and D are quad lane and, in block B952, processes Lane A. B. C and D data using logic for the particular function at that particular stage in the MAC pipeline (see FIG. 9B). After Lane A, B, C and D data is processed, the process waits for the next clock in block B908, and loops back to block B902.

At the stage in the MAC pipeline discussed above, Phase 0 was associated with Lane A frames, Phase 1 was associated with Lane B frames, Phase 2 was associated with Lane C frames and Phase 3 was associated with Lane D frames. At the next stage, the process of FIG. 9A will be repeated but lane to phase associations are rotated such that Phase 0 is associated with Lane D frames, Phase 1 is associated with Lane A frames, Phase 2 is associated with Lane B frames and Phase 3 associated with Lane C frames as shown in FIG. 8B. At each stage, the process will be repeated but with the next rotation of associations. However, the number of stages in the MAC 214 is set to take into account lane phase association rotation such that frames associated with a particular lane emerge from MAC 214 at the same phase at which they entered MAC 214 if required by the given implementation.

FIG. 9B is a flowchart illustrating one of the present embodiments of methods for processing frames at MAC 214, according to one embodiment. The process begins in block B960. In block B962, the process determines whether data on a particular lane is valid (i.e., the data that is read is valid when the data strobe asserted by the strobe counter 400 is active and the designated clock phase for moving data from the particular sub-port the data is from matches the current clock phase, as discussed above with respect to FIG. 6.). If yes, in block B964, the process determines if the protocol of the data is Fibre Channel. If yes, in block B966, the lane data is processed by logic for the particular function at that particular stage in MAC 214.

If it is determined in block B964 that the data protocol is not Fibre Channel, the lane data is processed in block B968 as Ethernet data by logic for the particular function at that particular stage in the MAC 214. In either case, after lane data is processed, the process exits in block B970 and proceeds to block B908 to wait for the next clock, and loop back to block B902 (see FIG. 9A). In yet another embodiment, additional test are made in flowchart shown in FIG. 9B for other supported protocols.

Figure 10:
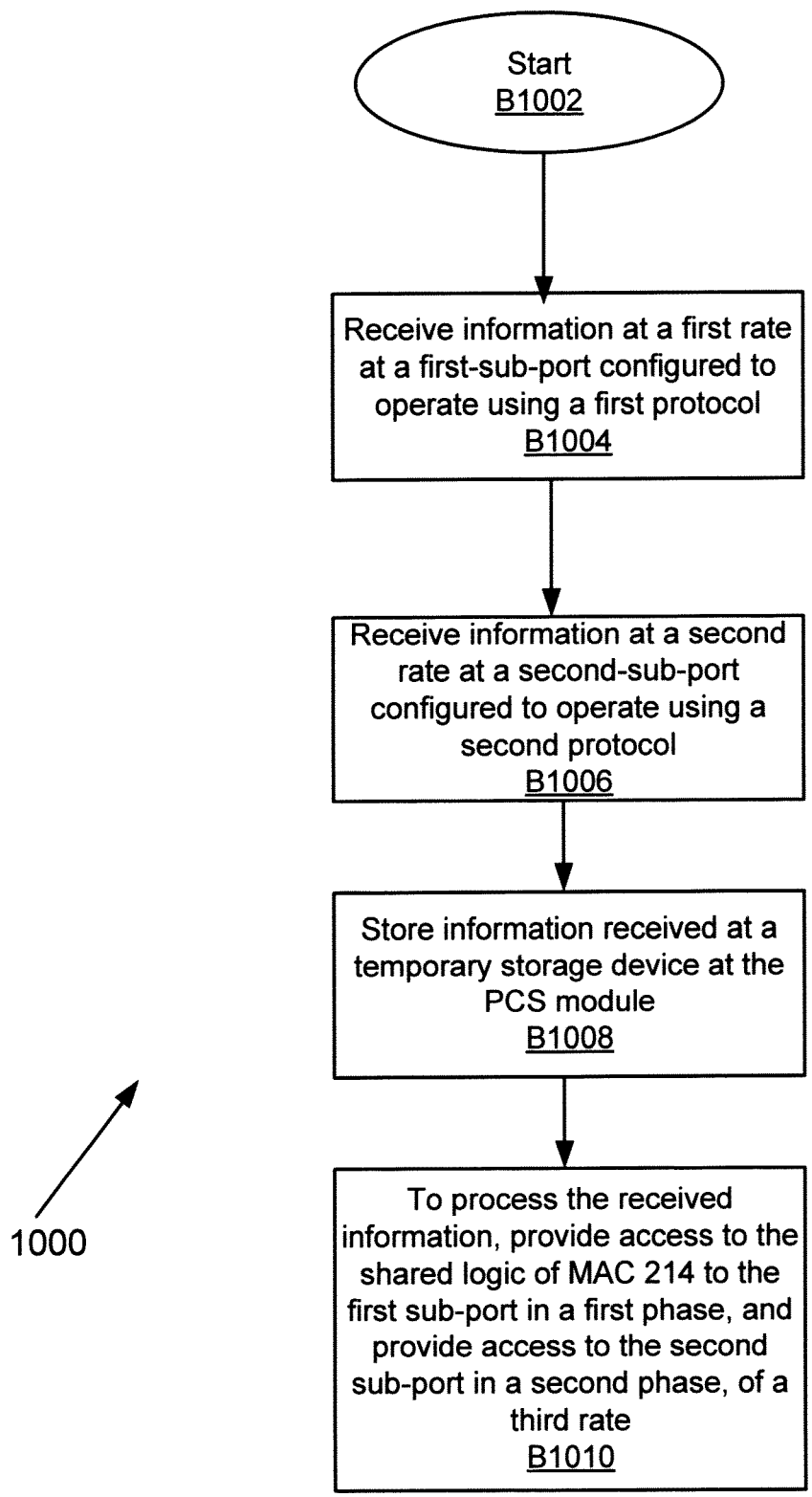

FIG. 10 shows a process 1000 for using the shared logic of MAC 214. The process begins in block B1002. In block B1004, information is received at a first clock rate (C1 254) at a first sub-port of base-port 128 that is configured to operate using a first protocol (for example, Fibre Channel) An administrator may configure the first sub-port using a management application executed at a computing system.

In block B1006, information is received at a second clock rate (for example, C2 255) at a second sub-port configured to operate using a second protocol (e.g. Ethernet)). In block B1008, the information for both the sub-ports is stored at a temporary storage device, for example, FIFO 252. In block B1010, information is first read out of the temporary storage device at a third clock rate (C3 256). The information is then processed by shared logic of FIG. 7A.

In one embodiment, the first sub-port is granted access to the shared logic in a first phase and the second sub-port is granted access to the logic in a second phase for processing the information that is read out at the third rate.

It is noteworthy that a similar process is used when the first sub-port and the second-port are transmitting information.

The embodiments disclosed herein have various advantages. For example, the same logic is used in the MAC 214 regardless of what protocol is being used by the ports. The foregoing allows for more efficient die area utilization because MAC 214 pipeline registers and combinatorial logic are not duplicated.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A method for processing information at a network device connected to a network, comprising:
   receiving first information conforming to a first protocol at a first clock rate at a first sub-port of the network device; wherein the network device includes a base-port having a plurality of sub-ports that can be configured to operate independently as a port for sending and receiving information at a plurality of rates complying with a plurality of protocols;
   receiving second information conforming to a second protocol at a second clock rate at a second sub-port;
   storing received first and second information in a temporary storage device at the base-port;
   reading first and second information out of the temporary storage device at a third clock rate; and
   processing the first and second information at a media access control (MAC) module that includes logic that is time-shared among the plurality of sub-ports to process information at the third rate for both the first protocol and the second protocol; wherein the first sub-port is granted access to the logic in a first phase and the second sub-port is granted access to the logic in a second phase for processing the first and second information after the first and second information is read out at the third clock rate.

2. The method of claim 1, wherein the temporary storage device is at a physical coding module (PCS) shared by the plurality of sub-ports.

3. The method of claim 1, wherein the first protocol is a Fibre Channel protocol and the second protocol is an Ethernet protocol.

4. The method of claim 1, wherein the plurality of sub-ports are configured as any one of a single lane, a dual lane, or a quad lane port.

5. The method of claim 1, wherein the MAC module is shared for both information received by the base-port and information transmitted by the base-port.

6. The method of claim 1, wherein the network device is a switch element coupled to a network.

7. A system for processing information at a network device, comprising:
   a computing system coupled to a network; and the network device coupled to the network; wherein the network device, comprises:
   a processor for executing firmware code;
   a base-port including a plurality of sub-ports to receive and transmit information; where the plurality of sub-ports can be configured to operate independently as a port for sending and receiving information at a plurality of rates complying with a plurality of protocols;
   wherein a first sub-port is configured to receive information conforming to a first protocol at a first clock rate; and a second sub-port is configured to receive information conforming to a second protocol at a second clock rate;
   a temporary storage device for storing received information that is read at a third clock rate; and
   a media access control (MAC) module that includes logic that is time-shared among the plurality of sub-ports to process information at the third clock rate for both the first protocol and the second protocol; wherein the first sub-port is granted access to the logic in a first phase and the second sub-port is granted access to the logic in a second phase for processing information that is read out from the temporary storage device at the third rate.

8. The system of claim 7, wherein the temporary storage device is at a physical coding module (PCS) shared by the plurality of sub-ports.

9. The system of claim 7, wherein the first protocol is a Fibre Channel protocol.

10. The system of claim 7, wherein the second protocol is an Ethernet protocol.

11. The system of claim 7, wherein the plurality of sub-ports are configured as any one of a single lane, a dual lane, or a quad lane port.

12. The system of claim 7, wherein the MAC module is shared for both information received by the base-port and information transmitted by the base-port.

13. The system of claim 7, wherein the network device is a switch element coupled to a network.

14. A network device coupled to a network via a network link for processing frames, comprising:
   a processor for executing firmware code;
   a base-port including a plurality of sub-ports to receive and transmit information; where the plurality of sub-ports can be configured to operate independently as a port for sending and receiving information at a plurality of rates complying with a plurality of protocols;
   wherein a first sub-port is configured to receive information conforming to a first protocol at a first clock rate; and a second sub-port is configured to receive information conforming to a second protocol at a second clock rate;
   a temporary storage device for storing received information that is read at a third clock rate; and
   a media access control (MAC) module that includes logic that is time-shared among the plurality of sub-ports to process information at the third rate for both the first protocol and the second protocol; wherein the first sub-port is granted access to the logic in a first phase and the second sub-port is granted access to the logic in a second phase for processing information that is read out from the temporary storage device at the third clock rate.

15. The system of claim 14, wherein the temporary storage device is at a physical coding module (PCS) shared by the plurality of sub-ports.

16. The device of claim 14, wherein the first protocol is a Fibre Channel protocol and the second protocol is an Ethernet protocol.

17. The device of claim 14, wherein the plurality of sub-ports are configured as any one of a single lane, a dual lane, or a quad lane port.

18. The device of claim 14, wherein the MAC module is shared for both information received by the base-port and information transmitted by the base-port.

19. The device of claim 14, wherein the network device is a switch element coupled to a network.

* * * * *

UNITED STATES PATENT AND TRADEMARK OFFICE
CERTIFICATE OF CORRECTION

| | | |
|---|---|---|
| PATENT NO. | : 9,046,941 B1 | Page 1 of 1 |
| APPLICATION NO. | : 13/678398 | |
| DATED | : June 2, 2015 | |
| INVENTOR(S) | : Dropps et al. | |

It is certified that error appears in the above-identified patent and that said Letters Patent is hereby corrected as shown below:

In the Specification

In column 3, line 9, delete ""logic."" and insert -- "logic," --, therefor.

In column 3, line 9, delete "'component.'" and insert -- "component," --, therefor.

In column 3, line 23, delete "program." and insert -- program, --, therefor.

In column 3, line 36, delete "media." and insert -- media, --, therefor.

In column 3, line 52, delete "HIPPI. SCSI. IP," and insert -- HIPPI, SCSI, IP, --, therefor.

In column 5, line 10, delete "controllers." and insert -- controllers, --, therefor.

In column 5, line 31, delete "mouse." and insert -- mouse, --, therefor.

In column 5, line 58, delete "teiin" and insert -- term --, therefor.

In column 8, line 38, delete "RPORT 202," and insert -- RPORT 202. --, therefor.

In column 9, line 2, delete "C2 256." and insert -- C2 256, --, therefor.

In column 12, line 62, delete "B608." and insert -- B908, --, therefor.

In column 13, line 61, delete "processed." and insert -- processed, --, therefor.

In the Claims

In column 17, line 1, in Claim 15, delete "system" and insert -- device --, therefor.

Signed and Sealed this
Twenty-fourth Day of November, 2015

Michelle K. Lee
*Director of the United States Patent and Trademark Office*